United States Patent
Kashyap et al.

(10) Patent No.: US 11,240,145 B2
(45) Date of Patent: Feb. 1, 2022

(54) SHARED RISK REPRESENTATION IN NETWORKS FOR TROUBLESHOOTING, ASSIGNMENT, AND PROPAGATION ACROSS LAYERS

(71) Applicant: Ciena Corporation, Hanover, MD (US)

(72) Inventors: Tarun Kashyap, Gurugram (IN); Brian Christopher Johnson, Ottawa (CA); Amal Karboubi, Oshawa (CA)

(73) Assignee: Ciena Corporation, Hanover, MD (US)

( * ) Notice: Subject to any disclaimer, the term of this patent is extended or adjusted under 35 U.S.C. 154(b) by 150 days.

(21) Appl. No.: 16/736,915

(22) Filed: Jan. 8, 2020

(65) Prior Publication Data

US 2021/0160174 A1    May 27, 2021

(30) Foreign Application Priority Data

Nov. 26, 2019  (IN) .............................. 201911048390

(51) Int. Cl.
    *H04L 12/703*   (2013.01)
    *H04L 12/723*   (2013.01)
    *H04L 12/707*   (2013.01)
(52) U.S. Cl.
    CPC .............. *H04L 45/28* (2013.01); *H04L 45/22* (2013.01); *H04L 45/50* (2013.01)
(58) Field of Classification Search
    CPC .......... H04L 45/28; H04L 45/22; H04L 45/50
    See application file for complete search history.

(56) References Cited

U.S. PATENT DOCUMENTS

| | | |
|---|---|---|
| 8,296,407 B2 | 10/2012 | Doshi et al. |
| 8,456,984 B2 | 6/2013 | Ranganathan et al. |
| 8,515,280 B1 | 8/2013 | Li et al. |
| 8,576,708 B2 | 11/2013 | Gandhi et al. |
| 8,824,334 B2 | 9/2014 | Vasseur et al. |
| 8,854,955 B2 | 10/2014 | Prakash et al. |
| 8,867,333 B2 | 10/2014 | Doshi et al. |
| 9,167,318 B1 | 10/2015 | Connolly et al. |
| 9,197,355 B2 | 11/2015 | Swinkels et al. |
| 9,497,521 B2 | 11/2016 | Sareen et al. |
| 2010/0172236 A1 | 7/2010 | Madrahalli et al. |
| 2014/0126355 A1 | 1/2014 | Filsfils et al. |
| 2014/0226967 A1 | 8/2014 | Ahuja et al. |

(Continued)

OTHER PUBLICATIONS

Mannie, Network Working Group, Standards Track, Generalized Multi-Protocol Label Switching (GMPLS) Architecture, The Internet Society, Oct. 2004, pp. 1-69.

(Continued)

*Primary Examiner* — Donald L Mills
(74) *Attorney, Agent, or Firm* — Clements Bernard Baratta; Lawrence A. Baratta, Jr.; Christopher L. Bernard

(57) ABSTRACT

Shared risk representation in networks for troubleshooting, assignment, and propagation across layers includes obtaining a configuration for a format to represent shared risks in a network; assigning a value to a plurality of shared risks in the network utilizing the format and utilizing a plurality of assignment techniques including automatic assignment and manual assignment; propagating the assigned values of the plurality of shared risks across one or more layers in the network; and storing the assigned values for use in path computation in the network.

16 Claims, 11 Drawing Sheets

(56) References Cited

U.S. PATENT DOCUMENTS

| | | | |
|---|---|---|---|
| 2014/0258486 A1 | 9/2014 | Filsfils et al. | |
| 2016/0112327 A1 | 4/2016 | Morris et al. | |
| 2016/0164739 A1 | 6/2016 | Skalecki | |
| 2016/0308757 A1* | 10/2016 | Filsfils | H04L 45/66 |
| 2017/0063666 A1* | 3/2017 | Ahuja | H04L 45/245 |
| 2020/0036623 A1* | 1/2020 | Kumar | H04L 45/24 |
| 2021/0111944 A1* | 4/2021 | Kuwabara | H04L 41/0663 |
| 2021/0211346 A1* | 7/2021 | Gerstel | G06F 11/00 |

OTHER PUBLICATIONS

Kompella et al., Network Working Group, Standards Track, OSPF Extensions in Support of Generalized Multi-Protocol Label Switching (GMPLS), The Internet Society, Oct. 2005, pp. 1-11.

Li et al., Network Working Group, Standards Track, IS-IS Extensions for Traffic Engineering, Redback Networks, Inc., Oct. 2008, pp. 1-17.

Farrel et al., Internet Engineering Task Force (IETF), Best Current Practice, ISSN: 2070-1721, Problem Statement and Architecture for Information Exchange between Interconnected Traffic-Engineered Networks, Jul. 2016, pp. 1-67.

ITU-T, Telecommunication Standardization Sector of ITU, G.8080/Y.1304, Architecture for the automatically switched optical network, Feb. 2012, pp. 1-124.

* cited by examiner

An example of how interpretation is impacted with different formats

| Format Schemas | Risk Domain Number | 32 Bit Format for Passing in the Stream | Interpretation of Risk for End User |
|---|---|---|---|
| Example 1:<br><br>Length: 32 bit<br>reserved : 3 bit<br>subNetwork: 5 bits, displayName: "Region",<br>RiskType: 4 bits, displayName: "riskType",<br>RiskValue: 20 bit<br><br>"subnetworkMapping":<br>{"California" : "1","Nevada" : "2" }<br><br>"riskTypeMapping" :<br>{"Photonic Node" : "1", "Add/Drop Bank": "2", "Site" : "3", "Conduit" : "4", "Degree" : "5", "Line Module" : "6"} | 18350095 | 32 bit:<br>00000001000110000000000000001111<br><br>Grouping:<br>Reserved:     000<br>SubNetwork:  00001<br>RiskType:      0001<br>riskValue:     10000000000000001111 | {<br>"region": "1",<br>"riskType": "1",<br>"riskValue": "524303"<br>}<br>Or<br>{<br>"region": "California",<br>"riskType": "Add/Drop Bank",<br>"riskValue": "524303"<br>} |
| Example 2:<br><br>Total: 32 bit<br>reserved : 3 bit<br>subNetwork: 6 bits, displayName: "subNetwork"<br>riskType: 5 bits, displayName: "category"<br>riskValue: 18 bit<br><br>"subnetworkMapping":<br>{"California" : "1","Nevada" : "2" }<br><br>"riskTypeMapping" :<br>{"Photonic Node" : "1", "Add/Drop Bank": "2", "Site" : "3", "Conduit" : "4", "Degree" : "5", "Line Module" : "6"} | 18350095 | 32 bit:<br>00000001000110000000000000001111<br><br>Grouping:<br>Reserved:     000<br>SubNetwork:  000010<br>RiskType:      00110<br>riskValue:     000000000000001111 | {<br>"subNetwork": "2",<br>"category" : "6"<br>"riskValue" : "15"<br>}<br>Or<br>{<br>"subnetwork": "Nevada",<br>"category" : "Line Module"<br>"riskValue" : "15"<br>} |

*FIG. 8*

SHARED RISK REPRESENTATION IN NETWORKS FOR TROUBLESHOOTING, ASSIGNMENT, AND PROPAGATION ACROSS LAYERS

FIELD OF THE DISCLOSURE

The present disclosure generally relates to networking. More particularly, the present disclosure relates to systems and methods for shared risk representation in networks for troubleshooting, assignment, and propagation across layers.

BACKGROUND OF THE DISCLOSURE

Shared Risk Group (SRG) is a concept in network routing that different connections may suffer from a common failure if they share a common risk or a common SRG. SRG can be used with optical networks, Ethernet networks, Multiprotocol Label Switching (MPLS) networks including the Generalized Multiprotocol Label Switching (GMPLS) networks, Internet Protocol (IP) networks, and the like as well as multi-layer networks. An SRG failure makes multiple connections go down because of the failure of a common resource those connections share. Examples of SRGs include Shared Risk Link Group (SRLG), Shared Risk Node Group (SRNG), Shared Risk Equipment Group (SREG), etc. An SRLG is a risk on a cable or the like, an SRNG is a risk associated with a node or network element, and an SREG is a risk that extends within the node or network element itself, e.g., down to a module or other type of equipment. The descriptions herein may reference SRLGs for illustration purposes, but those skilled in the art will recognize any, and all types of SRG risk representation are contemplated herein. SRLGs refer to situations where links in a network share a common fiber (or a common physical attribute such as fiber conduit or the like). If one link fails, other links in the group may fail too, i.e., links in the group have a shared risk which is represented by the SRLG. SRLGs are used in optical, Ethernet, MPLS, GMPLS, and/or IP networks and used for route computation for diversity.

In multi-layer networks, a link at an upper layer has a connection at a lower layer, and thus any network resources (links, nodes, line cards, and the like) used by the lower layer connection can be represented as SRLGs on the upper layer links. That is, MPLS tunnels, OTN connections, IP routes, etc. all operate on a lower layer optical network (Layer 0). For example, an MPLS link at an MPLS layer may have an SRLG to represent a connection at Layer 0 and thus any optical nodes, amplifiers, and muxing/demuxing components, as well as fiber cables and conduits used by the Layer 0 connection, are accounted for in SRLGs on the MPLS link. As an example, one would not want to protect MPLS tunnels where the protected tunnels share a risk in an optical network. The SRLGs are used in the MPLS route computation to ensure the protected tunnels share no common risks in the optical network. That is, route or path computation can compare SRLGs of links between two paths to determine if they are disjoint or not. If two paths have a common risk, i.e., share an SRLG, there is a possibility of a common fault taking both paths down. Of course, this defeats the purpose of protection and is to be avoided.

Shared risk techniques are further described in commonly-assigned U.S. patent application Ser. No. 16/660,134, filed Oct. 22, 2019, and entitled "Permitted network risks in diverse route determinations," and U.S. Pat. No. 10,116,552, issued Oct. 30, 2018, and entitled "Efficient shared risk group representation as a bit vector," the contents of each are incorporated herein by reference.

There are various disadvantages associated with conventional SRG representations. First, for example, tracking shared risks is complex and usually performed manually, such as using spreadsheets. Also, the shared risks are numerical or data values that are difficult to understand by users. Second, the conventional approach includes manually identifying risks and assigning shared risk identifiers to such risks. Here, the user has to ensure uniqueness of each risk, manually assign values, track such assignments, attempt to instill some structure into the assignments, etc. These manual processes are tedious, cumbersome, time-consuming, error-prone, etc.

There is a need to improve the troubleshooting, assignment, and propagation (tracking) of shared risks, across multiple layers, in networks.

BRIEF SUMMARY OF THE DISCLOSURE

The present disclosure relates to systems and methods for shared risk representation in networks for troubleshooting, assignment, and propagation across layers. In an embodiment, the present disclosure includes configuration control of shared risk assignment and visual presentation of shared risk in a meaningful manner to users. In another embodiment, the present disclosure includes automatic shared risk assignment to resources based on user configuration. In a further embodiment, the present disclosure includes propagation of shared risks across one or more network layers (e.g., Layer 0—optical, Layer 1—Time Division Multiplexing (TDM), Layer 2—packet, etc.).

In an embodiment, a non-transitory computer-readable medium having instructions stored thereon for programming a processor to perform steps of obtaining a configuration for a format to represent shared risks in a network; assigning a value to a plurality of shared risks in the network utilizing the format and utilizing a plurality of assignment techniques including automatic assignment and manual assignment; propagating the assigned values of the plurality of shared risks across one or more layers in the network; and storing the assigned values for use in path computation in the network. The instructions stored can further program the processor to perform steps of receiving a query for the assigned value of a shared risk; and providing details of the shared risk based on interpreting the assigned value based on the format.

The format can include a plurality of subcomponents grouped in an n-bit number. The plurality of subcomponents can include a subnetwork, a risk type, and a risk value. The subnetwork can be utilized to segment domains in the network, wherein the risk type defines a specific type of risk, and wherein the risk value is a unique value for a specific risk type in the specific subnetwork. The assigned values can be stored with an identification of its specific assignment technique. The plurality of assignment techniques can further include inheritance from a physical layer. The automatic assignment can be based on identifiers that identify specific equipment in the network, and wherein the identifiers are matched to predetermined criteria. The one or more layers can include a plurality of Optical Multiplex Section (OMS), Layer 0, Optical Transport Network, Link Layer Discovery Protocol (LLDP) link, and Traffic Engineering (TE) link.

In another embodiment, an apparatus includes a processor and memory comprising instructions that, when executed, cause the processor to obtain a configuration for a format to represent shared risks in a network, assign a value to a plurality of shared risks in the network utilizing the format and utilizing a plurality of assignment techniques including automatic assignment and manual assignment, propagate the assigned values of the plurality of shared risks across one or more layers in the network, and store the assigned values for use in path computation in the network.

In a further embodiment, a method includes obtaining a configuration for a format to represent shared risks in a network; assigning a value to a plurality of shared risks in the network utilizing the format and utilizing a plurality of assignment techniques including automatic assignment and manual assignment; propagating the assigned values of the plurality of shared risks across one or more layers in the network; and storing the assigned values for use in path computation in the network.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a block diagram of a controller that can form a controller, the network element, a Path Computation Element (PCE), a Software-Defined Networking (SDN) controller, a management system, or the like.

FIG. 8 is a table with examples of different SRLG formats and different interpretations.

DETAILED DESCRIPTION OF THE DISCLOSURE

Again, the present disclosure relates to systems and methods for shared risk representation in networks for troubleshooting, assignment, and propagation across layers. In an embodiment, the present disclosure includes configuration control of shared risk assignment and visual presentation of shared risk in a meaningful manner to users. In another embodiment, the present disclosure includes automatic shared risk assignment to resources based on user configuration. In a further embodiment, the present disclosure includes propagation of shared risks across one or more network layers (e.g., Layer 0—optical, Layer 1—Time Division Multiplexing (TDM), Layer 2—packet, etc.).

Example Network with SRGs

Figure 1:
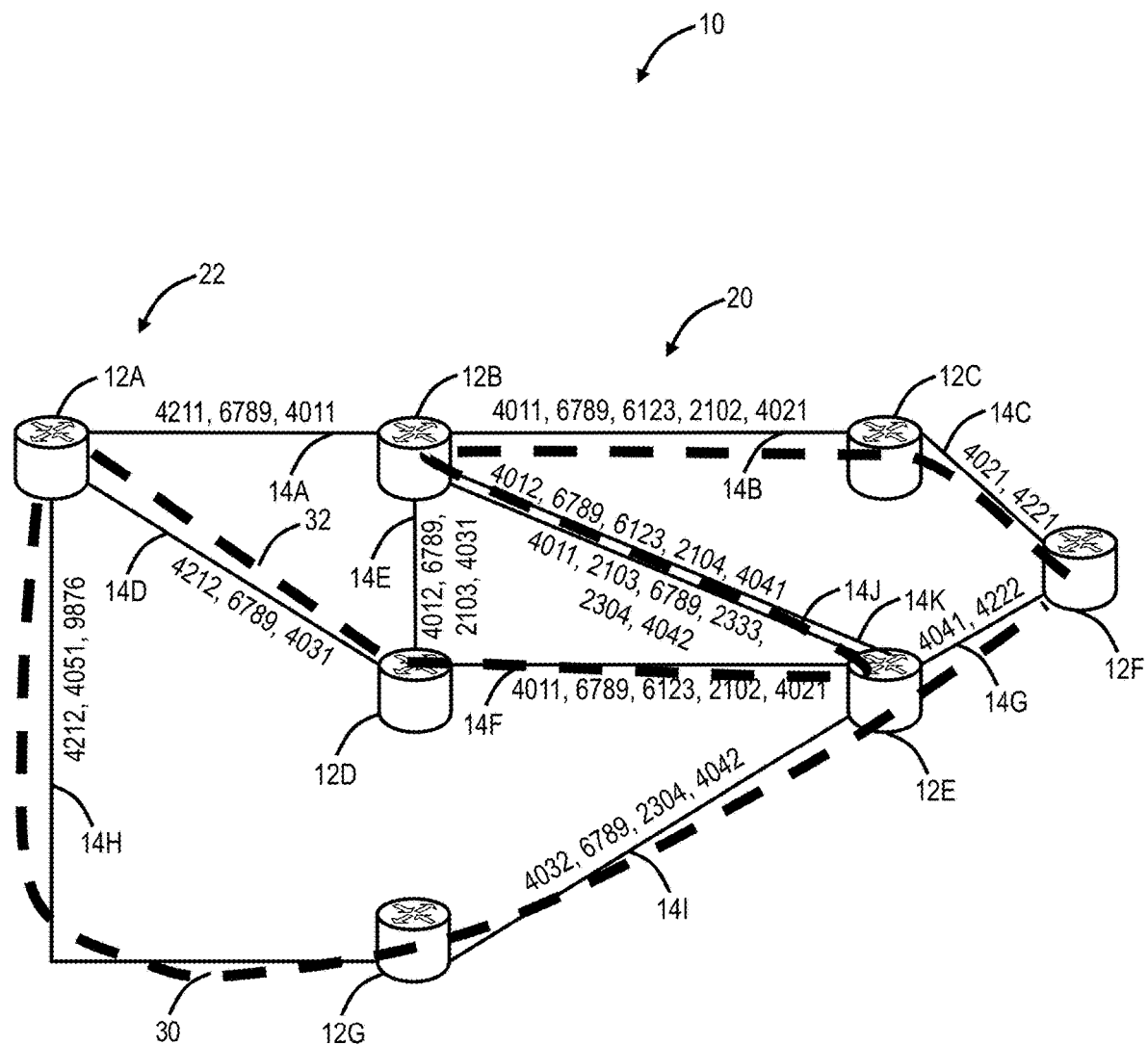
FIG. 1 is a network diagram of a network of network elements (labeled as network elements 12A-12G) interconnected by links.

FIG. 1 is a network diagram of a network 10 of network elements 12 (labeled as network elements 12A-12G) interconnected by links 14 (labeled as links 14A-14I). The network elements 12 communicate with one another over the links 14 through Layer 0 (L0) such as optical wavelengths (Dense Wave Division Multiplexing (DWDM)), Layer 1 (L1) such as OTN, Layer 2 (L2) such as Ethernet, MPLS, etc., Layer 3 (L3) protocols, and/or combinations thereof. The network elements 12 can be network elements which include a plurality of ingress and egress ports forming the links 14. The network elements 12 can be switches, routers, cross-connects, etc. operating at one or more layers. An example network element 12 implementation is illustrated in FIG. 1. The network 10 can include various services or calls between the network elements 12. Each service can be at any of the L0, L1, L2, and/or L3 protocols, such as a wavelength, a Subnetwork Connection (SNC), an LSP, a tunnel, a connection, etc., and each service is an end-to-end path and from the view of the client signal contained therein, it is seen as a single network segment. The network 10 is illustrated, for example, as an interconnected mesh network, and those of ordinary skill in the art will recognize the network 10 can include other architectures, with additional network elements 12 or with fewer network elements 12, etc. as well as with various different interconnection topologies and architectures.

The network 10 can include a control plane operating on and/or between the network elements 12. The control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements 12; calculation and creation of paths for calls or services; network-level protection and restoration; and the like. In an exemplary embodiment, the control plane can utilize Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane can utilize any type of control plane for controlling the network elements 12 and establishing, maintaining, and restoring calls or services between the nodes 12. In another embodiment, the network 10 can include a Software-Defined Networking (SDN) controller for centralized control. In a further embodiment, the network 10 can include hybrid control between the control plane and the SDN controller. In yet a further embodiment, the network 10 can include a Network Management System (NMS), Element Management System (EMS), Path Computation Element (PCE), etc. That is, the present disclosure contemplates any type of controller for path computation utilizing the permitted network risks described herein. That is, the present disclosure is not limited to a control plane, SDN, PCE, etc. based path computation technique.

Again, SRLGs are risks that are compared between two potential paths to ensure diversity therebetween. The risks can include, without limitation, fibers, fiber conduits, physical junctions, bridges, Reconfigurable Optical Add/Drop Multiplexer (ROADM) degree, network element 12, a module in the network element 12, or any physical construct associated with the link 14 physically. For diversity, the SRLGs between two connections are compared, and any shared risk indicates a diversity concern or single point of failure for both connections. The objective of SRLGs is to model various risks to enable comparison during route computation.

In FIG. 1, each link 14 is assigned associated SRLGs 20 for risks, and each is a unique value. Also, each node 12 is assigned associated SRNGs and/or SREGs 22, again each is a unique value representing a specified risk. Note, for illustration purposes, the SRNGs and/or SREGs 22 just show the reference numeral of the network element, e.g., 12A. Also, for illustration purposes, FIG. 1 lists each SRLG 20 as a four-digit number, but those skilled in the art will recognize these SRLGs, SRNGs, and SREGs can be a 32-bit value or the like. For example, the link 14A has SRLGs 4211, 6789, 4011 and the link 14B has SRLGs 4011, 6789, 6123, 2102, 4021. In route computation, the fact these two links 14A, 14B have the same SRLGs 6789, 4011 indicates these links 14A, 14B have a common risk and are not diverse/disjoint. The link 14H has SRLGs 4212, 4051, 9876, and when compared to the link 14A, there are no common SRLGs, and thus these two links 14A, 14H are diverse, i.e., no common risk. Depending on the network 10 implementation, the SRLGs 20 and the SRNGs and/or SREGs 22 can be flooded (in a control plane), managed (in an SDN controller, NMS, EMS, PCE, etc.), or the like. As described herein, the general term "shared risk" is used to refer to any of SRLGs, SRNGs, SREGs, etc. Also, the present disclosure may simply use the term SRLG, and those of ordinary skill in the art will recognize this can refer to any shared risk including node risks, equipment risks, etc., i.e., not simply link risks.

As an example, assume there are two connections 30, 32 between the network elements 12A, 12F, e.g., the connection 30 can be a primary tunnel (LSP), and the connection 32 can be a backup tunnel (LSP). Thus, there is a requirement for the connection 30 and the connection 32 to be disjoint, i.e., that they do not share a network risk. The connection 30 has a path over links 14H, 14I, 14G. The path for the connection 32 is calculated, and then all of the network risks on the calculated path are compared to the network risks on the path for the connection 30. Assume the only viable path for the connection 32 is through the network element 12E. With conventional approaches, this path would fail as here the connection 32 would share a same network risk, namely the network element 12E, as the connection 30. However, these paths do not share a link 14. The network element 12E is a "permitted network risk." With the present disclosure, this permitted network risk is allowed, such that the connections 30, 32 can share the network element 12E, if required for the connection 32.

Example Network Element/Node

Figure 2:
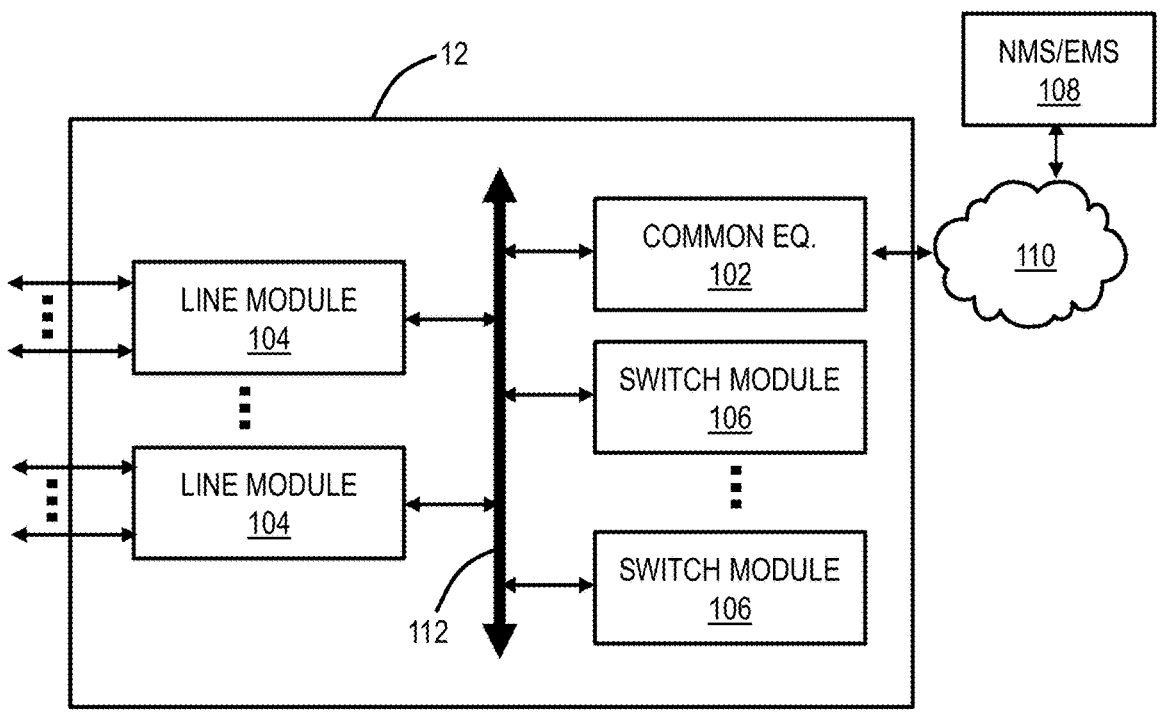
FIG. 2 is a block diagram of an example network element (node) for use with the systems and methods described herein.

FIG. 2 is a block diagram of an example network element 12 (node) for use with the systems and methods described herein. In an embodiment, the network element 12 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 12 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the network element 12 can be any digital and/or optical system with ingress and egress digital and/or optical signals and switching of channels, timeslots, tributary units, wavelengths, etc.

In an embodiment, the network element 12 includes common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a management system 108 through a data communication network 110 (as well as a PCE, an SDN controller, etc.). Additionally, the common equipment 102 can include a control plane processor, such as a controller 200 illustrated in FIG. 3 configured to operate the control plane as described herein. The network element 12 can include an interface 112 for communicatively coupling the common equipment 102, the line modules 104, and the switch modules 106 to one another. For example, the interface 112 can be a backplane, midplane, a bus, optical and/or electrical connectors, or the like. The line modules 104 are configured to provide ingress and egress to the switch modules 106 and to external connections on the links to/from the network element 12. In an embodiment, the line modules 104 can form ingress and egress switches with the switch modules 106 as center stage switches for a three-stage switch, e.g., a three-stage Clos switch. Other configurations and/or architectures are also contemplated.

Further, the line modules 104 can include a plurality of optical connections per module, and each module may include a flexible rate support for any type of connection. The line modules 104 can include WDM interfaces, short-reach interfaces, and the like, and can connect to other line modules 104 on remote network elements, end clients, edge routers, and the like, e.g., forming connections on the links in the network 10. From a logical perspective, the line modules 104 provide ingress and egress ports to the network element 12, and each line module 104 can include one or more physical ports. The switch modules 106 are configured to switch channels, timeslots, tributary units, packets, etc. between the line modules 104. For example, the switch modules 106 can provide wavelength granularity (Layer 0 switching); OTN granularity; Ethernet granularity; and the like. Specifically, the switch modules 106 can include Time Division Multiplexed (TDM) (i.e., circuit switching) and/or packet switching engines. The switch modules 106 can include redundancy as well, such as 1:1, 1:N, etc.

Those of ordinary skill in the art will recognize the network element 12 can include other components which are omitted for illustration purposes, and that the systems and methods described herein are contemplated for use with a plurality of different network elements with the network element 12 presented as an example type of network element. For example, in another embodiment, the network element 12 may not include the switch modules 106, but rather have the corresponding functionality in the line modules 104 (or some equivalent) in a distributed fashion. Also, the network element 12 may omit the switch modules 106 and that functionality, such as in a DWDM terminal. For the network element 12, other architectures providing ingress, egress, and switching are also contemplated for the systems and methods described herein. In general, the systems and methods described herein contemplate use with any network element, and the network element 12 is merely presented as an example for the systems and methods described herein. Further, various examples described herein utilize a 32-bit value for a shared risk, but those skilled in the art will recognize other values, larger or smaller, are also contemplated.

Example Controller

Figure 3:
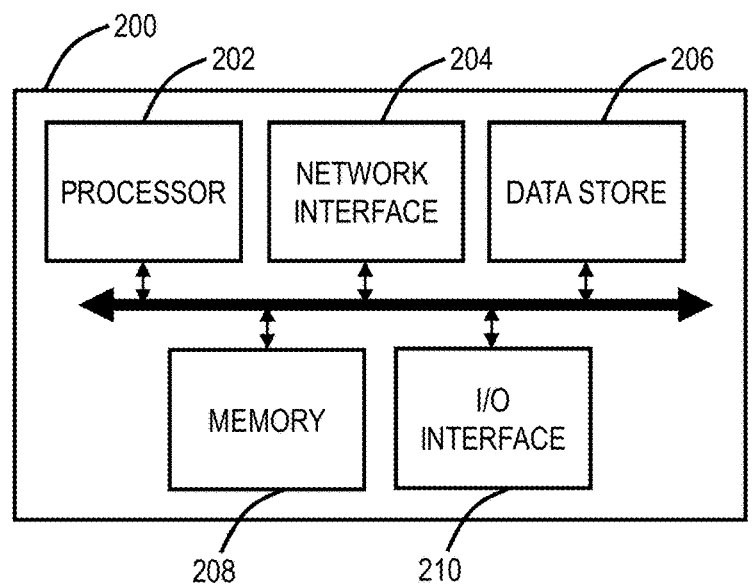

FIG. 3 is a block diagram of a controller 200 which can form a controller for the network element 12, a PCE, an SDN controller, the management system 108, or the like. The controller 200 can be part of the common equipment, such as common equipment 102 in the network element 100, or a stand-alone device communicatively coupled to the network element 100 via the data communication network 110. In a stand-alone configuration, the controller 200 can be the management system 108, a PCE, etc. The controller 200 can include a processor 202 which is a hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on the DCN 110, such as to communicate control plane information to other controllers, to the management system 108, to the nodes 100, and the like. The network interface 204 can include, for example, an Ethernet module. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Further, the I/O interface 210 includes components for the controller 200 to communicate with the other nodes, such as using overhead associated with OTN signals.

The controller 200 is configured to implement software, processes, algorithms, etc. that can control configurable features of the network 10, such as automating discovery of the network elements 12, capacity on the links 14, port availability on the network elements 12, connectivity between ports; dissemination of topology and bandwidth information between the network elements 12; path computation and creation for connections; network-level protection and restoration; and the like. As part of these functions, the controller 200 can include a topology database that maintains the current topology of the network 10, such as based on control plane signaling and a connection database that maintains available bandwidth on the links again based on the control plane signaling as well as management of the network risks for diverse path computation.

SRLG Interpretation

Again, in simple terms, SRLG is used to achieve diverse protect paths so that a working and a protect path do not have any component common, thereby avoiding a single point of failure. All components in the path may be assigned a unique number (SRLG value) so that a path computation device, software, element, etc. matches list of components in a protect path against those of a working path. It is common in SRLG solutions to generate SRLG values by combining multiple smaller values together in a concatenation or bit-vector type scheme. This may be to define sub-domains from which multiple users can independently generate network-wide unique values, or it may be to help identify which risk the SRLG instance is modeling. All such smaller groups of values should combine together to form an n-bit SRLG value.

Figure 4:
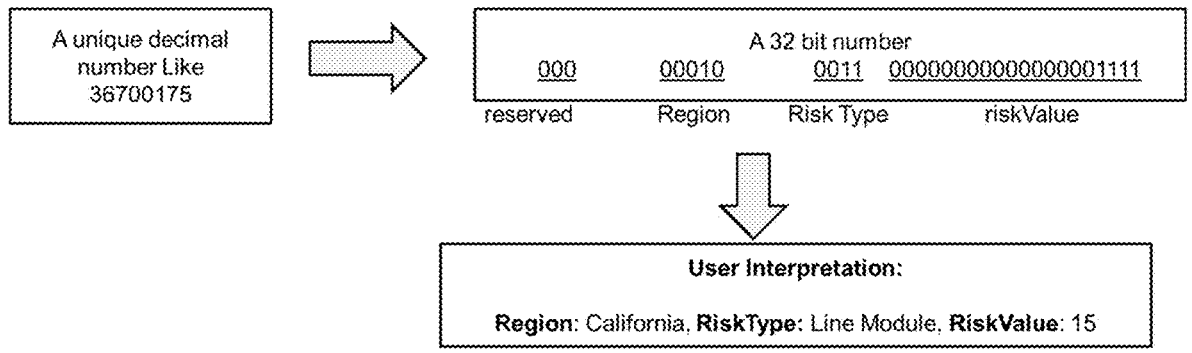
FIG. 4 is an example of a single SRLG value and how it is interpreted from a user's point of view.

FIG. 4 is an example of a single SRLG value and how it is interpreted from a user's point of view. Here, the SRLG value is a 32-bit number that is partitioned between a reserved value, a region, a risk type, and a risk value. The present disclosure includes a structure for the SRLG values. Such structure can be adjusted, customer-specific, etc. The value of such a structure is that a computing system can infer information to visually display meaningful information about each SRLG value to a user. The present disclosure includes grouping of SRLGs as sub-components. The selection criteria and grouping of these sub-components to form SRLG value is operator dependent and is part of operator's strategy to achieve uniqueness (e.g., unique SRLG in a given region or across network).

The present disclosure provides a hierarchy of configuration (selection of sub-components and their position in an n-bit SRLG number, number of regions in a network, type of components/risk types, desirable display format of SRLG value, etc.) that allows an administrator of the management system 108 to provide an overlay of information that describes the structure of sub-components of an SRLG value.

Figure 5:
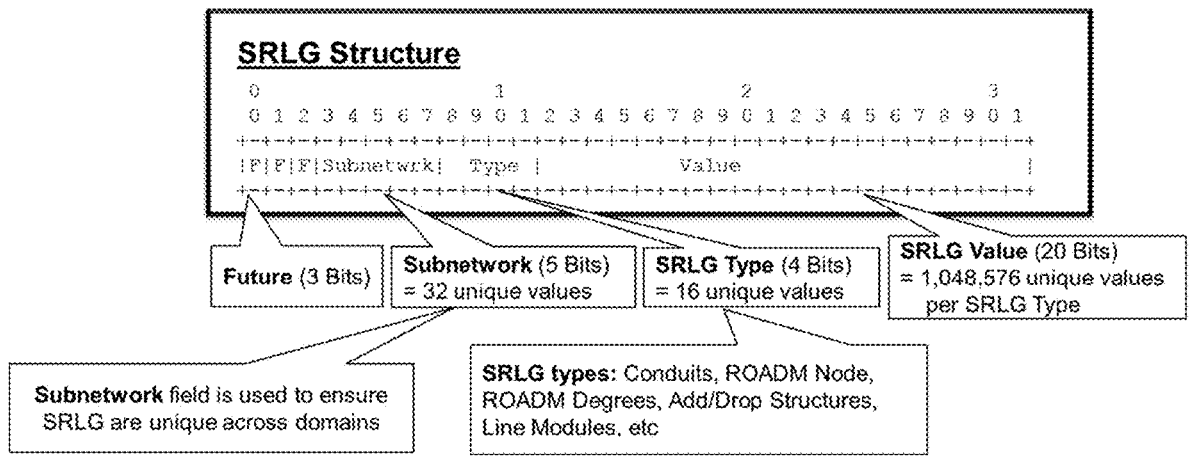
FIG. 5 is a diagram of an example structure for a shared risk representation, i.e., an SRLG.

FIG. 5 is a diagram of an example structure for a shared risk representation, i.e., an SRLG. The shared risk representation is designed to be unique across subnetworks, is structured and mapped to aid in troubleshooting, and is configurable to match different schemes. In the example in FIG. 5, the shared risk representation is a 32-bit representation with the first 3 bits reserved for future use, the next 5 bits for defining a subnetwork (allowing 32 unique values), the next 4 bits for SRLG type (16 unique values), and the final 20 bits for SRLG value (1,048,576 unique values, per SRLG type). The subnetwork allows an operator to partition the network and/or partition different layers. The SRLG type is used to denote a type of shared risk, e.g., conduits, ROADM node, ROADM degrees, add/drop structures, line modules, etc. Finally, the SRLG value is unique to represent a specific type of SRLG in a specific subnetwork.

In an embodiment, the structure for a shared risk representation is definable via the management system 108. For SRLGs that are 32-bit numbers, each component in the SRLG format can include 1) a name for the system-defined component (support for custom fields is possible), 2) an allocation of bits {1-32 from most significant, and 3) the ability to assign a value for the component for all risks.

The SRLG type field includes pre-defined types. To enable auto-assignment, the management system 108 requires pre-defined types that can be mapped to be discovered, commissioned, and/or provisioned resources to be able to identify unique instances. The SRLG types can have labels and values assigned to suit the presentation desired by the operator. Types in general are user configurable. Types related to auto-assignment capability are pre-defined.

The following table includes examples of possible shared risk (SRLG) types. Each of the SRLG types can have a specific input mode—inherited, manual, or automatically assigned.

| Type | Description | Input Mode |
|---|---|---|
| Conduit | Fiber Plant | Manual Entry |
| Fiber Management | Tray, etc. internal to central office, data center | Manual Entry |
| Site | Floor, Building, etc | Manual Entry |
| Power Supply | Breaker Panel, etc. external to the node | Manual Entry |
| Custom (multiple) | User-defined | Manual Entry |
| ROADM Degree | Optical line system | Auto assigned |
| OTU Link | OTUk, OTUCn | Auto assigned |
| Packet Link | LLDP | Auto assigned |
| Add/Drop Bank | Wavelength access structure | Auto assigned |
| Line Module | OTN/Packet Circuit Pack with interfaces | Auto assigned |
| Photonic Node | ROADM Target Identifier (TID) | Auto assigned |
| OTN Node | Switching or Broadband | Auto assigned |
| Packet Node | Switching, Blade based or Chassis | Auto assigned |
| Multiservice Node | TID | Auto assigned |
| Shelf | Shelf | Auto assigned |
| OTN Subsystem | Equipment Group | Auto assigned |
| Packet Subsystem | Equipment Group | Auto assigned |

The subnetwork is used to keep shared risk namespaces separate between distinct subnetworks, managed by the same management system 108.

Figure 6:
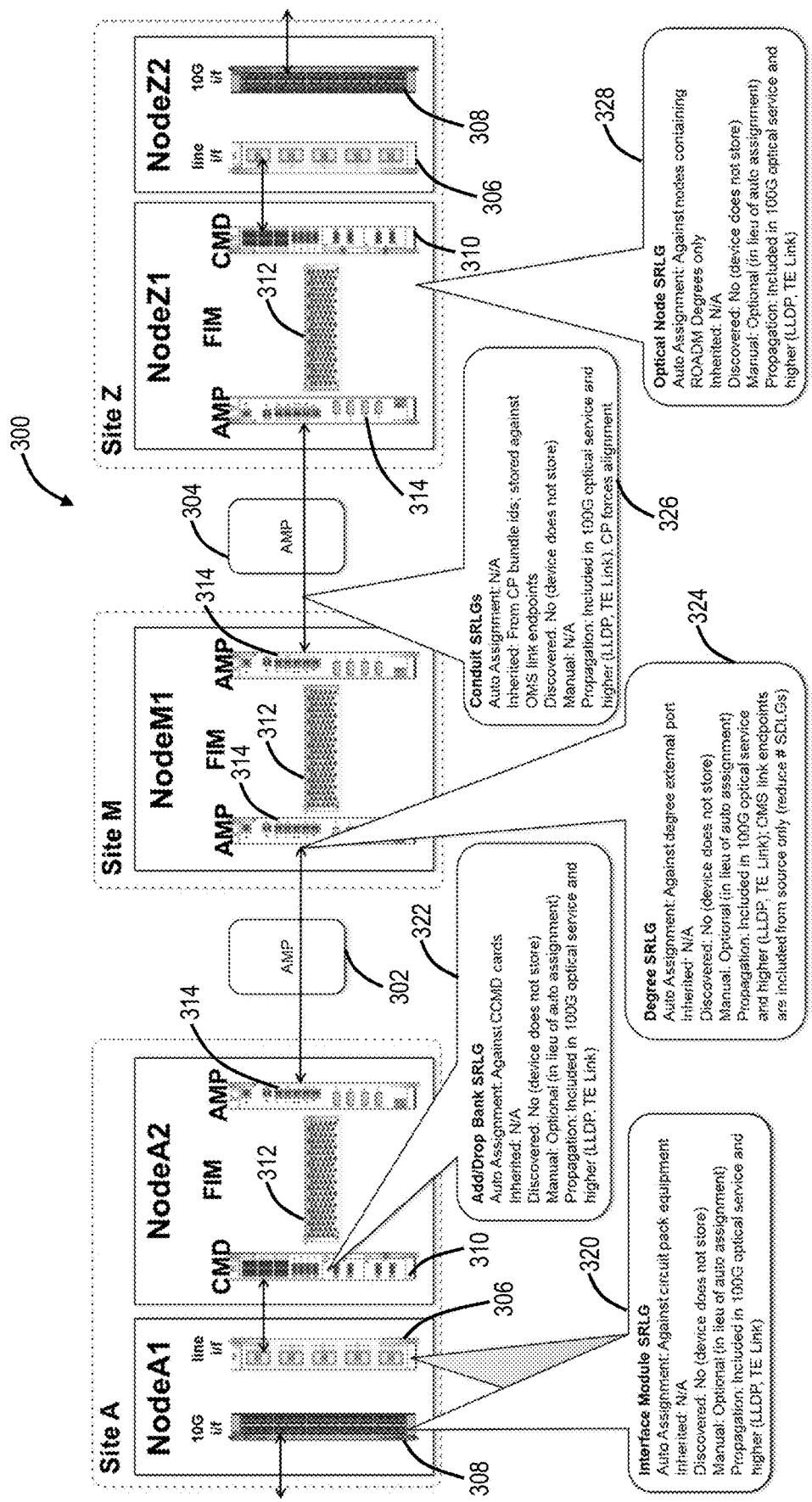
FIG. 6 is a network diagram of an Optical Multiplex Section (OMS) to illustrate shared risk assignment.

FIG. 6 is a network diagram of an Optical Multiplex Section (OMS) 300 to illustrate shared risk assignment. The OMS 300 includes three sites, Site A, M, Z, five nodes Node A1, A2, M1, Z1, Z2, and two intermediate line amplifiers 302, 304. The nodes A1, Z2 include a line interface 306 and a client interface 308. That is, the nodes A1, Z2 can be optical terminals. The nodes A2, Z1 include a Channel Multiplexer/Demultiplexer (CMD) 310, a Fiber Interface Manager (FIM) 312, and an amplifier 314. The nodes A2, Z1 are ROADM nodes. Finally, the node M1 includes two amplifiers 314 and an FIM 312. Starting at Site A, example SRLGs are assigned for an interface module SRLG 320, an add/drop bank SRLG 322, a degree SRLG 324, a conduit SRLG 326, and an optical node SRLG 328.

There is a manual assignment of SRLGs for non-managed resources, i.e., resources that are not managed by the management system 108. That is, the risk information here is not derivable by the management system and requires entry by the user. Examples include, without limitation, conduits, patch panels, LGXs, breaker panels, etc. For example, a conduit risk can be assigned to OTS, OMS, TE link. Users are also able to manually assign SRLGs to nodes and equipment (substitute for auto-assignment).

For the fiber plant, conduit risks can be inherited from Layer 0 links in the network. That is, these values can be automatically inherited from associated values in the network. For example, the following attributes can be set—Subnetwork (Region)—adopted from a node of the link, risk type=conduit, and risk value=a bundle ID (e.g., a bundle ID can be a 16 bit, Risk Value field is configured to 20 bits, so the 4 most significant bits will be zeros).

Figure 7:
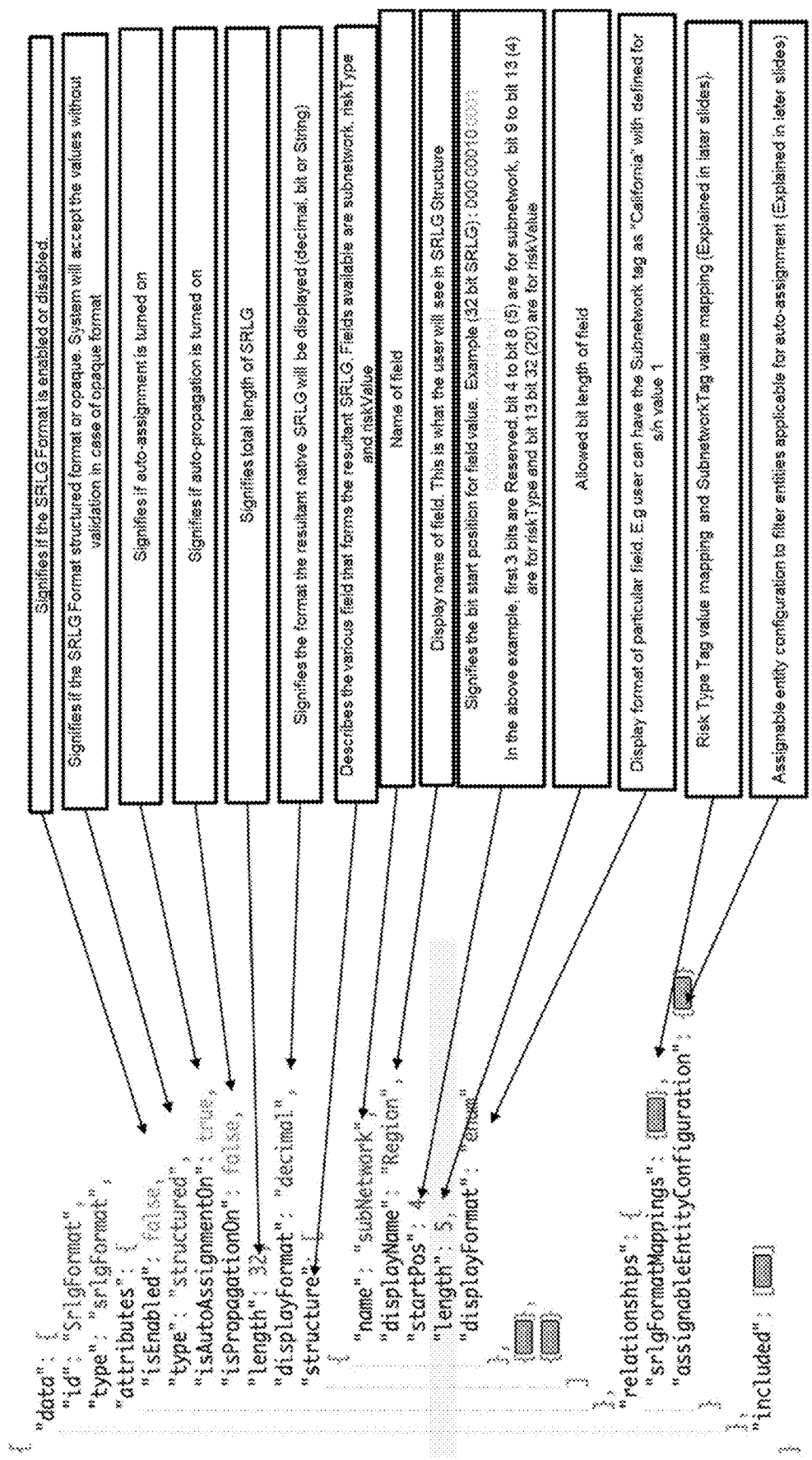
FIG. 7 is a diagram of configuring an example SRLG format.

FIG. 7 is a diagram of configuring an example SRLG format. The SRLG format is flexible, enabling different lengths (in bits) and different subcomponents. Again, in this example, the SRLG is 32 bits. The enumerations of subcomponents can be described to allow the interpretation of SRLG values in a human-readable format.

FIG. 8 is a table with examples of different SRLG formats and different interpretations. For example, a device stores an SRLG as a decimal number, but users need to have some meaningful interpretation of such numbers. Moreover, every Service provider may have different interpretation of SRLG. FIG. 8 illustrates some examples of how the present disclosure introduces structure. Typically, a user starts with his interpreted SRLG value and translates to SRLG format that device understands, e.g., a decimal number. Also, this translation logic will be user (network operator) specific that needs to be followed in the entire network but may differ for different network operator.

In FIG. 8, the decimal value will have different Structured/interpreted SRLG responses depending on the format that was configured by the user. Conversely, the same structured SRLG would convert to a different SRLG value depending on the configured SRLG format. So, SRLGs will be interpreted by the system depending on the SRLG format configured by the administrator.

In an embodiment, the SRLG structure and format enable query and interpretation services for all the users of the management system 108. The system asks the administrator to determine the format only once. Then onwards, the system will do the translation functions for various SRLG related operations as per the remembered format until administrator wants to use a different format and configures new format.

Figure 9:
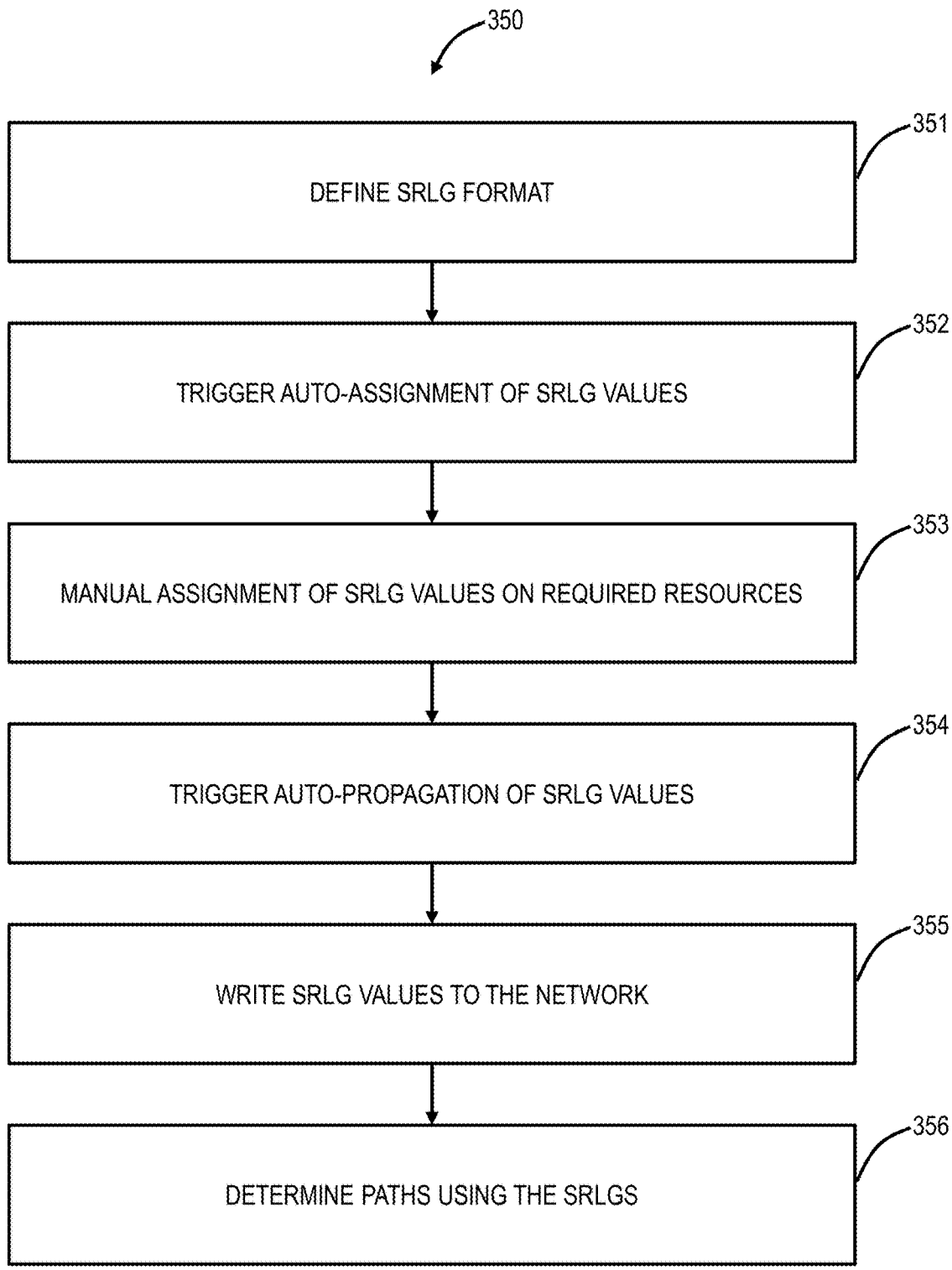
FIG. 9 is a flowchart of an SRLG process.

FIG. 9 is a flowchart of an SRLG process 350. The SRLG process 350 includes defining the SRLG format (step 351), triggering auto-assignment of SRLG values (step 352), performing a manual assignment of SRLG values on required resources (step 353), triggering auto-propagation of SRLG values (step 354), writing the SRLG values to the network (step 355), and determining paths, in the network, using the SRLGs (step 356).

Figure 10:
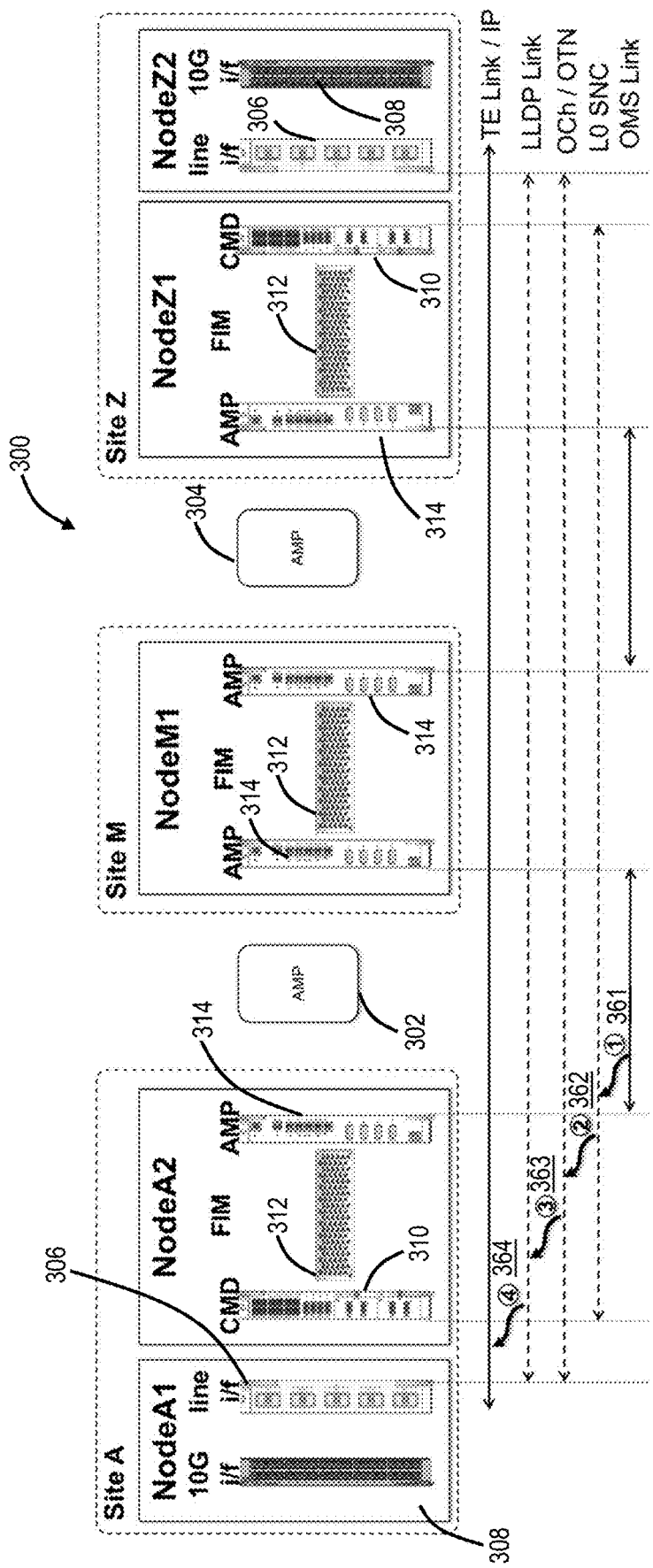
FIG. 10 is a network diagram of the OMS to illustrate shared risk assignment and multi-layer SRLG propagation.

FIG. 10 is a network diagram of the OMS 300 to illustrate shared risk assignment and multi-layer SRLG propagation. The multi-layer SRLG propagation includes SRLGs (assigned to each OMS Link, ROADM node, etc.) are propagated to the L0 connection (e.g., Subnetwork Connection (SNC)) (step 361, OMS link to L0 SNC connection). The L0 connection info can be based on related control plane link information. The SRLGs (from SNC, line module, etc) are propagated to the 100G line based on SNC+adjacency between the line port and CMD (step 362, L0 SNC connection to Optical Transport Network (OTN)). The SRLGs (from 100G line, switched node) are propagated to the LLDP link through relationship between the L2 port and the OTN port (step 363, OTN to Link Layer Discovery Protocol (LLDP) link). Finally, the SRLGs (from LLDP link) are propagated to the Traffic Engineering (TE) link through the relationship to the LLDP link(s) (step 364).

Figure 11:
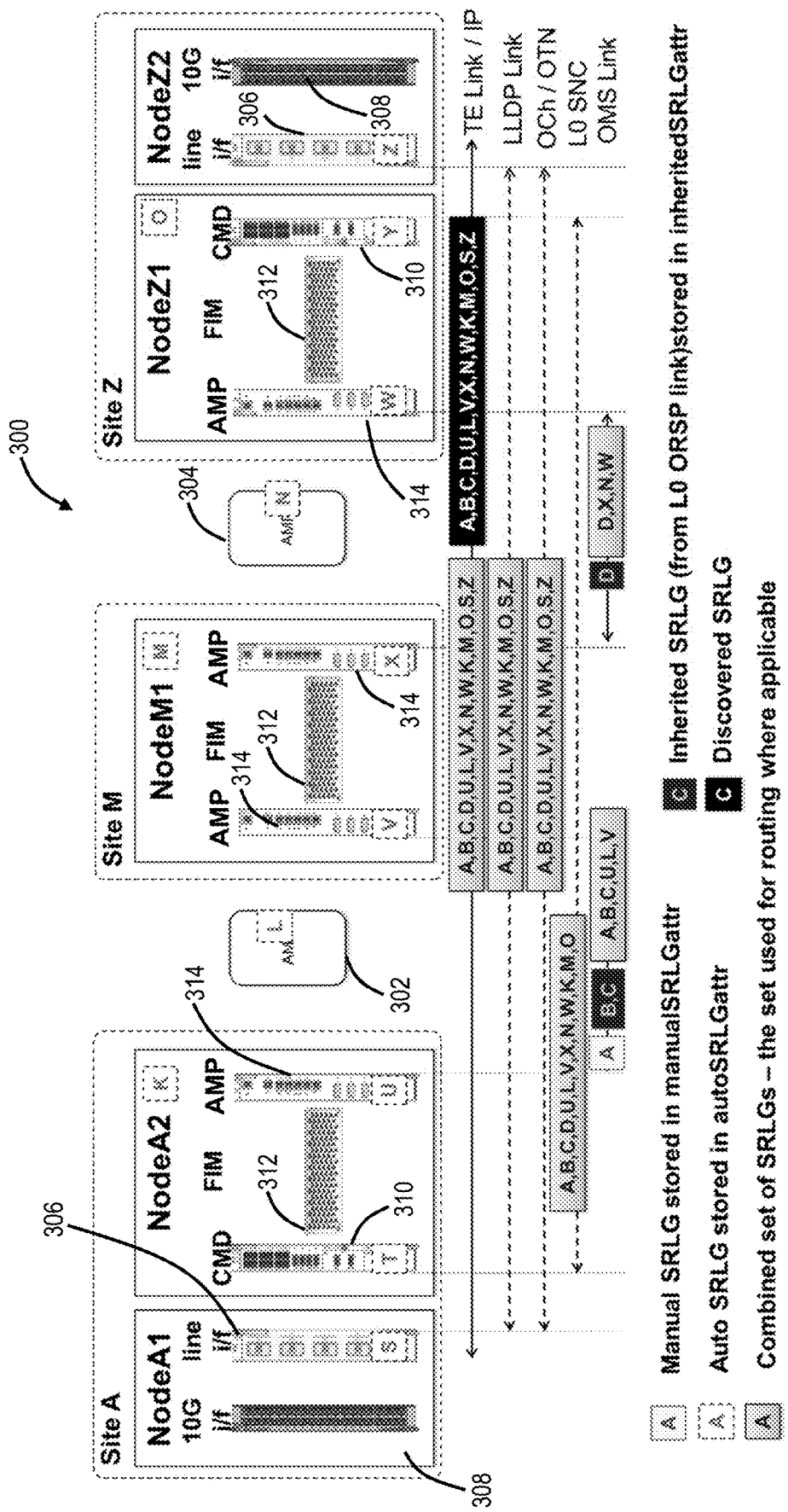
FIG. 11 is a network diagram of the OMS to illustrate SRLG assignment and propagation.

The SRLGs can be manually defined, automatically assigned, inherited, combined (some combination of manual, automatic, and/or inherited, etc.). FIG. 11 is a network diagram of the OMS 300 to illustrate SRLG assignment and propagation.

Automatic Assignment

Again, manual assignment is a tedious and cumbersome task in large networks (1000s of nodes and 10s of thousands of components). A user would need to put days of effort and would use spreadsheets to keep track of planned SRLGs to be assigned on resources. Also, ensuring uniqueness of SRLGs across resources per region or category is difficult. Since manual assignment is a tedious task, it may lead to days of effort in a network before manual assignment of SRLG is achieved. Even if there is a script written to write the planned SRLGs to resources, the initial planning of SRLGs for resources would still be a laborious task and is prone to human errors.

With auto-assignment of SRLGs with a user-defined set of identification mechanism, the tasks would be reduced to hours (or may be fraction of hour's) for system and eliminates human errors. The system auto-calculates SRLGs, categorizes SRLGs as per the user configurations thus abstracting complexity of task. Moreover, the process can be performed in the background, and the user can check the job status and details of each resource assignment statement at later point of time.

A limiting factor for auto assignment of SRLGs to managed resources is the number of resultant values, which is prohibitively large for use with in-network control planes and would degrade the performance of management system based PCEs. The present disclosure offers the ability for the user to specify instances of resources resource types that they consider high value in their network and configure the system (e.g., the management system 108) to auto-assign SRLGs only to them.

1) the user decides which resources will be targeted using an inventory search capability, meaning any set of resources that can be queried can be used as the target set.

2) the type of resource is defined by the user and hence is extendible as new technologies are added to the network.

3) multiple queries can be combined for the same resource type.

4) Representational state transfer (REST) Application Programming Interface (API) based queries allow the user to test that the desired entities are properly targeted before configuring auto-assignment.

5) Multiple Pool support for tracking unique SRLG values per entity type (i.e., reuse of risk ids across entity types).

In an example of the configuration of resource identification, for equipment, a user could direct the system to identify all equipment with a mentioned product equipment code (PEC) codes as "Add/Drop Bank" and "Line Module" riskType respectively and system would need to auto-calculate and auto-assign SRLGs to all such equipment. Users can change the list of PEC codes or can add a new criterion like "availability Status," "ReservationStatus," maintenanceMode" that are supported by the management system 108 inventory search to include or filter equipment. That is, the identification can be automated based on some unique identification information available in the inventory applications associated with the management system 108.

1) The identification of resources is configurable and can be controlled completely by user.

2) The identification of resources can be configured at run time, i.e., the user can change the identification criteria for resources on a deployed and running system.

3) The "resource identification" configuration can be validated by the user against the system's inventory search APIs. So, the auto-assignment is guaranteed to get applied to user's validated configuration only.

4) The identified SRLG applied to resources are guaranteed to be unique per resource based on the Pool. The pool can be a combination of (a) the subnetwork (user-controlled; user can determine the number of subnetworks in the system), and (b) RiskType, i.e., type of the resource. (user-controlled; user can determine the different categories of resources, e.g., Add/Drop Bank/Line Module/Photonic Node, etc.).

5) This solution would allow the System's PCE to be more responsive and aligned to the user's preference (picking diverse paths as per user's identified resources, i.e., SRLGs through this mechanism.

Multi-Layer Propagation and Troubleshooting

The present disclosure can use a technique of storing data in a network management system in a segmented fashion (e.g., Manual, Auto, Inherited, Propagated, Combined & Discovered) and with relationships to resources in the network to enable a user (human or machine) to derive the source of the information without maintaining an external journal or database.

Figure 12:
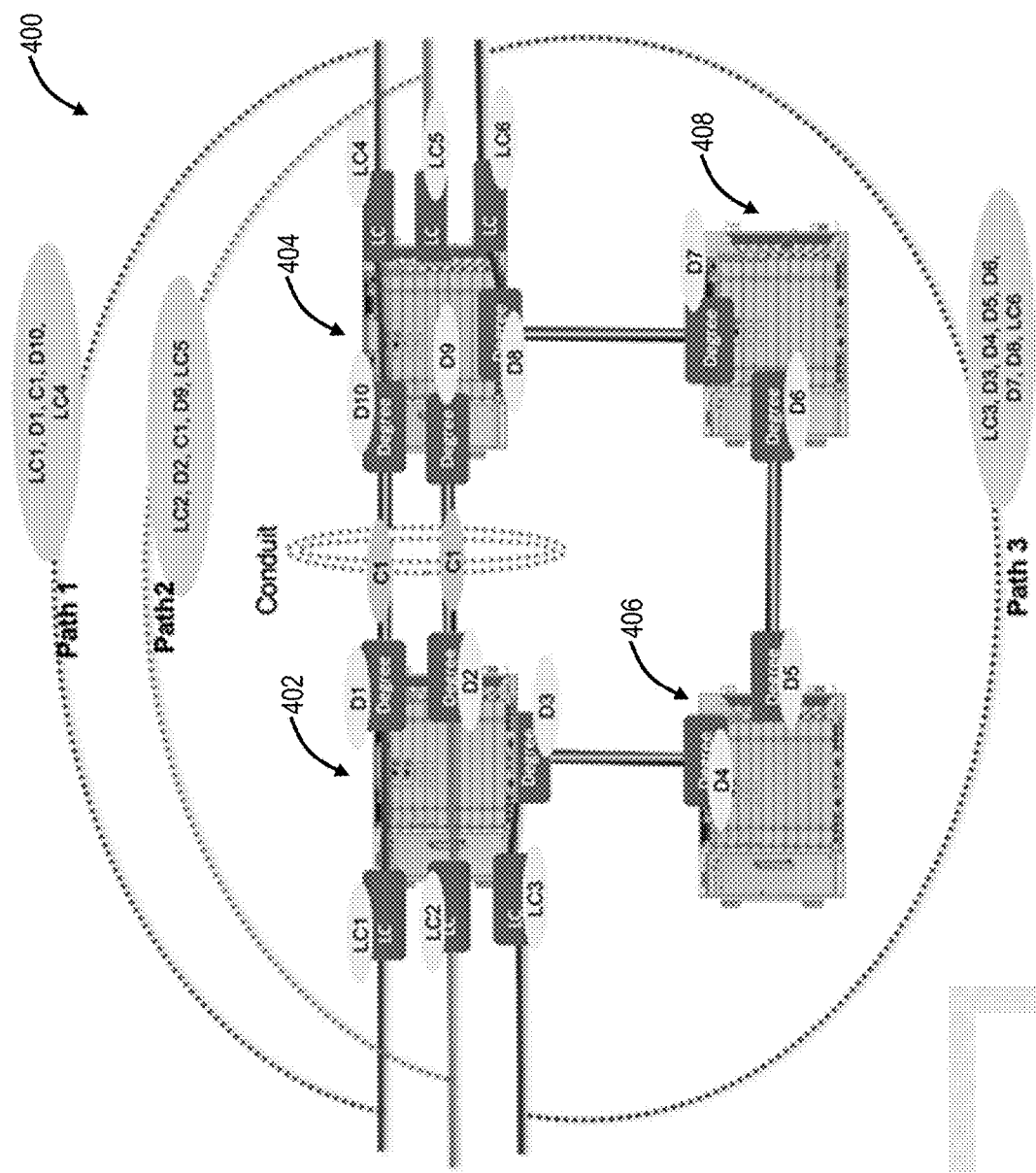
FIG. 12 is a network diagram of a network to illustrate SRLG propagation.

FIG. 12 is a network diagram of a network 400 to illustrate SRLG propagation. The network 400 is a simple example with three possible paths 1, 2, 3 going through four nodes 402, 404, 406, 408. In order to ascertain that these 3 paths are diverse, these must go through different components.

The Present Disclosure Allows the Following:

1) Auto-assign SRLGs to components that are modeled by the management system 108. For example, SRLGs are auto-assigned by the management system 108 to Line cards (LCs), Degrees that are known to the system, etc.

2) The management system 108 provides a mechanism to manually assign SRLG to components for risks that are not modeled in the management system 108 and cannot be known. For example, the 2 fibers from Degree with SRLG D1->D10 and D2->D9 go through the same conduit and hence carry the common risk of damage of this conduit. The management system 108, however, does not know of the conduit and hence, cannot model this risk. So, the user can assign SRLG (e.g., C1) to both fibers manually.

3) The management system 108 propagates all SRLGs to paths by analyzing risks due to component each path relies on. Using this information, the user can know the diversity issues. For example, path 1 and path 2 are not diverse as they have a common SRLG C1 due to the conduit.

All the above information is categorized for troubleshooting purposes so that the user knows how what all paths are dependent on a given component/risk. Conversely, the user may wish to know what all paths a given component can break if it gets damaged.

Propagation of SRLGs in a system generally occurs to place, on a routing link, the set of SRLGs that represent the associated dependent resources. In a multilayer network, the routing link (e.g., L2/L1 links) and the source of the SRLGs (for L0 equipment/degree) can have several degrees of separation and thus understanding or troubleshooting the sets of SRLGs can be difficult.

To add to this complication, SRLGs could have been manually assigned to the routing link, auto-assigned to the routing link, or discovered from the network. Then due to propagation and flooding of SRLGs in a network, combined with the network protocol's inability to interpret SRLGs, creates a situation where source information (SRLG source interpretations, i.e., which component and in which layer an SRLG number belongs to) is lost.

The present disclosure provides the ability to take an opaque SRLG from any place it is found in the network and query for the original source (i.e., to which resource it is related), how it got related and to which resources it has been associated and the purpose of that association (i.e., deciphering the opaque SRLG to a component in a specific region/location).

In an embodiment, the management system 108 can include a User Interface (UI) where a user can define the SRLG format, perform assignments, and query an SRLG assignment to identify resources to which it is applied and how it is applied to these resources. Also, the user can query a resource to understand what all SRLGs are assigned to it and how were these applied. Alternatively, the system can show the SRLGs as per the user-configured SRLG format.

This technique of tracking the source of the SRLGs has two primary parts:

1) storage of SRLGs in separate groups (discovered versus manual versus auto versus propagated versus combined).

2) the ability to query the resources by SRLGs.

This combination allows the user to look at the SRLGs associated with any resource (including routing interfaces on any node in the network) and quickly determine where the SRLG was originally applied and which exact resource instance to which it applies.

SRLG Process

Figure 13:
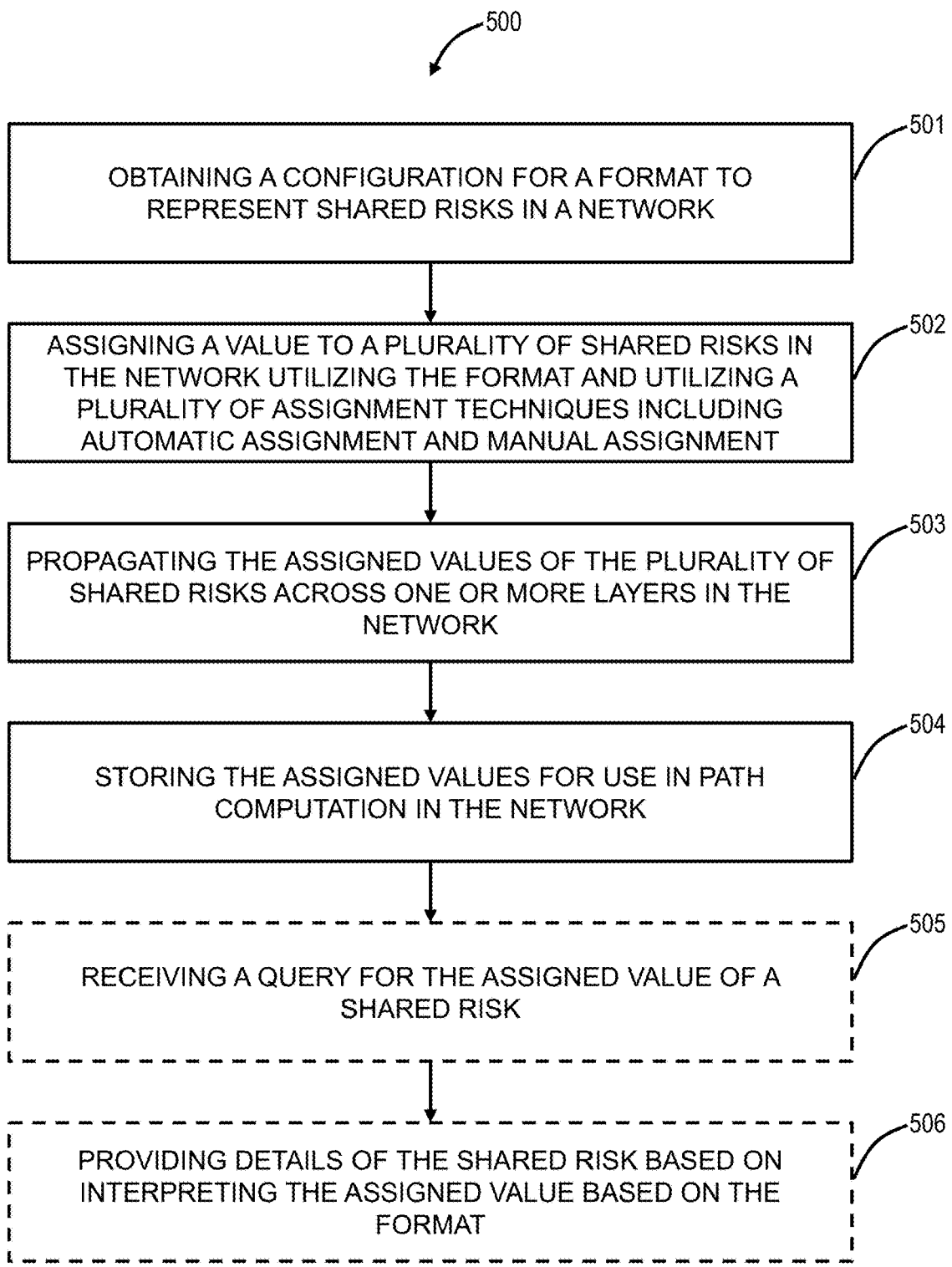
FIG. 13 is a flowchart of a shared risk process.

FIG. 13 is a flowchart of a shared risk process 500. The shared risk process 500 includes various steps that can be performed in different orders. Further, some embodiments may include a subset of the various steps. The shared risk process 500 can be implemented as a computer-implement method, via an apparatus such as the controller 200, and as instructions stored in a non-transitory computer-readable medium.

The shared risk process 500 includes obtaining a configuration for a format to represent shared risks in a network (step 501); assigning a value to a plurality of shared risks in the network utilizing the format and utilizing a plurality of assignment techniques including automatic assignment and manual assignment (step 502); propagating the assigned values of the plurality of shared risks across one or more layers in the network (step 503); and storing the assigned values for use in path computation in the network (step 504).

The shared risk process 500 can further include receiving a query for the assigned value of a shared risk (step 505); and providing details of the shared risk based on interpreting the assigned value based on the format (step 506). The format can include a plurality of subcomponents grouped in an n-bit number. The plurality of subcomponents can include a subnetwork, a risk type, and a risk value. The subnetwork is utilized to segment domains in the network, wherein the risk type defines a specific type of risk, and wherein the risk value is a unique value for a specific risk type in the specific subnetwork.

The assigned values can be stored with an identification of its specific assignment technique. The plurality of assignment techniques can further include inheritance from a physical layer. The automatic assignment can be based on identifiers that identify specific equipment in the network, and wherein the identifiers are matched to predetermined criteria. The one or more layers can include a plurality of Optical Multiplex Section (OMS), Layer 0, Optical Transport Network, Link Layer Discovery Protocol (LLDP) link, and Traffic Engineering (TE) link.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processor to perform steps of:
obtaining a configuration for a format to represent shared risks in a network, wherein the format includes a plurality of subcomponents grouped in an n-bit number, and wherein the plurality of subcomponents include a subnetwork, a risk type, and a risk value, each being a separate set of bits in the n-bit number;
assigning a value to a plurality of shared risks in the network utilizing the format and utilizing a plurality of assignment techniques including automatic assignment and manual assignment, wherein the automatic assignment includes pre-defined labels for the risk type and mapping of discovered risks based thereon by a management system;
propagating the assigned values of the plurality of shared risks across one or more layers in the network; and
storing the assigned values for use in path computation in the network.

2. The non-transitory computer-readable medium of claim 1, wherein the instructions stored further program the processor to perform steps of
receiving a query for the assigned value of a shared risk; and
providing details of the shared risk based on interpreting the assigned value based on the format.

3. The non-transitory computer-readable medium of claim 1, wherein the subnetwork is utilized to segment domains in the network, wherein the risk type defines a specific type of risk, and wherein the risk value is a unique value for a specific risk type in the specific subnetwork.

4. The non-transitory computer-readable medium of claim 1, wherein the assigned values are stored with an identification of its specific assignment technique.

5. The non-transitory computer-readable medium of claim 1, wherein the plurality of assignment techniques further include inheritance from a physical layer.

6. The non-transitory computer-readable medium of claim 1, wherein the automatic assignment is based on identifiers that identify specific equipment in the network, and wherein the identifiers are matched to predetermined criteria.

7. The non-transitory computer-readable medium of claim 1, wherein the one or more layers include a plurality of Optical Multiplex Section (OMS), Layer 0, Optical Transport Network, Link Layer Discovery Protocol (LLDP) link, and Traffic Engineering (TE) link.

8. An apparatus comprising:
a processor and memory comprising instructions that, when executed, cause the processor to
obtain a configuration for a format to represent shared risks in a network, wherein the format includes a plurality of subcomponents grouped in an n-bit number, and wherein the plurality of subcomponents include a subnetwork, a risk type, and a risk value, each being a separate set of bits in the n-bit number,
assign a value to a plurality of shared risks in the network utilizing the format and utilizing a plurality of assignment techniques including automatic assignment and manual assignment, wherein the automatic assignment includes pre-defined labels for the risk type and mapping of discovered risks based thereon by a management system,
propagate the assigned values of the plurality of shared risks across one or more layers in the network, and
store the assigned values for use in path computation in the network.

9. The apparatus of claim 8, wherein the instructions stored further cause the processor to
receive a query for the assigned value of a shared risk, and
provide details of the shared risk based on interpreting the assigned value based on the format.

10. The apparatus of claim 8, wherein the subnetwork is utilized to segment domains in the network, wherein the risk type defines a specific type of risk, and wherein the risk value is a unique value for a specific risk type in the specific subnetwork.

11. The apparatus of claim 8, wherein the assigned values are stored with an identification of its specific assignment technique.

12. The apparatus of claim 8, wherein the plurality of assignment techniques further include inheritance from a physical layer.

13. The apparatus of claim 8, wherein the automatic assignment is based on identifiers that identify specific equipment in the network, and wherein the identifiers are matched to predetermined criteria.

14. The apparatus of claim 8, wherein the one or more layers include a plurality of Optical Multiplex Section (OMS), Layer 0, Optical Transport Network, Link Layer Discovery Protocol (LLDP) link, and Traffic Engineering (TE) link.

15. A method comprising:
obtaining a configuration for a format to represent shared risks in a network, wherein the format includes a plurality of subcomponents grouped in an n-bit number, and wherein the plurality of subcomponents include a subnetwork, a risk type, and a risk value, each being a separate set of bits in the n-bit number;
assigning a value to a plurality of shared risks in the network utilizing the format and utilizing a plurality of assignment techniques including automatic assignment and manual assignment, wherein the automatic assignment includes pre-defined labels for the risk type and mapping of discovered risks based thereon by a management system;
propagating the assigned values of the plurality of shared risks across one or more layers in the network; and
storing the assigned values for use in path computation in the network.

16. The method of claim 15, further comprising
receiving a query for the assigned value of a shared risk; and
providing details of the shared risk based on interpreting the assigned value based on the format.

* * * * *